(12) United States Patent
Motoyoshi

(10) Patent No.: US 10,516,436 B2
(45) Date of Patent: Dec. 24, 2019

(54) SPREAD-SPECTRUM-SIGNAL RECEPTION APPARATUS AND SPREAD CODE INITIALIZATION METHOD

(71) Applicant: Mitsubishi Electric Corporation, Tokyo (JP)

(72) Inventor: Katsuyuki Motoyoshi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 9 days.

(21) Appl. No.: 16/073,283

(22) PCT Filed: Apr. 19, 2016

(86) PCT No.: PCT/JP2016/062332
§ 371 (c)(1),
(2) Date: Jul. 26, 2018

(87) PCT Pub. No.: WO2017/183101
PCT Pub. Date: Oct. 26, 2017

(65) Prior Publication Data
US 2019/0044572 A1    Feb. 7, 2019

(51) Int. Cl.
*H04W 72/04* (2009.01)
*H04B 1/7073* (2011.01)
(Continued)

(52) U.S. Cl.
CPC ............ *H04B 1/7073* (2013.01); *G01S 19/01* (2013.01); *H04B 2001/70706* (2013.01); *H04B 2201/7073* (2013.01); *H04W 72/0453* (2013.01)

(58) Field of Classification Search
USPC .................... 375/149, 368, 354; 370/314
See application file for complete search history.

(56) References Cited

U.S. PATENT DOCUMENTS 5,140,618 A * 8/1992 Kinoshita ............. H04J 3/0608
370/513
5,259,004 A * 11/1993 Nakayama ............ H04L 7/0331
370/509

(Continued)

FOREIGN PATENT DOCUMENTS

JP          4027520 B2    12/2007
WO   WO 2012/101935 A1    8/2012

*Primary Examiner* — Eva Y Puente
(74) *Attorney, Agent, or Firm* — Birch, Stewart, Kolasch & Birch, LLP

(57) ABSTRACT

A spread-spectrum-signal reception apparatus includes a controller to obtain a phase comparison value that is a phase of a spread code at a time at which initialization of a phase of the spread code is performed and which corresponds to a timing of a top of a frame of a received signal, and to output an initialization instruction including the phase comparison value when having determined that a current time is within a range of a time window; and a signal processor to demodulate the received signal in accordance with the spread code, to perform a frame synchronizing process on the demodulated signal to detect a frame timing, and to perform the initialization at a timing determined in accordance with a result of comparison between the phase comparison value included in the initialization instruction and a phase of the spread code at the frame timing.

4 Claims, 3 Drawing Sheets

(51) Int. Cl.
*G01S 19/01* (2010.01)
*H04B 1/707* (2011.01)

(56) References Cited

U.S. PATENT DOCUMENTS

| | | | |
|---|---|---|---|
| 5,940,006 A * | 8/1999 | MacLellan | G01S 13/825 |
| | | | 235/375 |
| 6,678,315 B1 | 1/2004 | Hikita et al. | |
| 9,510,308 B2 | 11/2016 | Wang et al. | |
| 2007/0116104 A1 * | 5/2007 | Fujiwara | H04B 1/7183 |
| | | | 375/149 |

* cited by examiner

SPREAD-SPECTRUM-SIGNAL RECEPTION APPARATUS AND SPREAD CODE INITIALIZATION METHOD

FIELD

The present invention relates to a reception apparatus that receives a spread spectrum signal.

BACKGROUND

In communication using a spread spectrum signal, the phase of a spread code used for the spread spectrum is regularly initialized (spread code initialization). In spread code initialization, in a system in which the period of spread code initialization and the period of the spread code are not synchronized with each other, it is necessary to perform initialization in the middle of the period of the spread code. Therefore, it is necessary for a receiving side to detect a timing at which initialization of the phase of the spread code is performed (an initialization timing) on a transmitting side, and to perform initialization synchronized with the detected initialization timing. As a method for achieving this synchronization, there is a method that determines whether the initialization timing has come close within the time of one period of the spread code for every period of the spread code on the receiving side; and that, when it is detected that the initialization timing has come close within the time of one period of the spread code, initializes a phase of the spread code at a timing of a specific phase of the spread code within the detected one period (Patent Literature 1).

CITATION LIST

Patent Literature

Patent Literature 1: International Publication No. WO2012/101935 (FIG. 4)

SUMMARY

Technical Problem

In a spread-spectrum reception apparatus that uses the method of initializing a phase of a spread code described in the above Patent Literature 1, it is necessary to identify a timing at which the spread code is initialized within the time of one period of the spread code. Therefore, in a case where the period of the spread code is short, a time from detection of a fact that the initialization timing has come close within the time of one period of the spread code and identification of the initialization timing until initialization is actually performed becomes short, so that control of an initialization process becomes difficult.

The present invention has been achieved in view of the above problems, and an object of the present invention is to provide a spread-spectrum-signal reception apparatus that can lengthen a time from identification of a timing of spread code initialization to actual initialization.

Solution to Problem

A spread-spectrum-signal reception apparatus according to the present invention is a spread-spectrum-signal reception apparatus to receive a signal having a spectrum spread with a spread code, the spread-spectrum-signal reception apparatus including: a control unit to obtain a phase comparison value that is a phase of the spread code at a time at which initialization of a phase of the spread code is performed and which corresponds to a timing of a top of a frame of the received signal, and to output an initialization instruction including the phase comparison value when having determined that a current time is within a range of a time window defined with respect to the time at which the initialization is performed; and a signal processor to demodulate the received signal in accordance with the spread code, to perform a frame synchronizing process on the demodulated signal to detect a frame timing corresponding to a top of a frame of the received signal, and to perform the initialization at a timing determined in accordance with a result of a comparison between the phase comparison value included in the initialization instruction and a phase of the spread code at the frame timing, in response to reception of an input of the initialization instruction.

A spread code initialization method according to the present invention is a spread code initialization method performed for a spectrum-spread-signal reception apparatus to receive a signal spectrum spread with a spread code, the spread code initialization method including: obtaining a phase comparison value that is a phase of the spread code at a time at which initialization of the phase of the spread code is preformed and which corresponds to a timing of a top of a frame of the received signal; determining that a current time is within a range of a time window defined with respect to the time at which the initialization is performed; outputting an initialization instruction including the phase comparison value when a current time is within the range of the time window; demodulating the received signal in accordance with the spread code, and performing a frame synchronizing process with respect to the demodulated signal to detect a frame timing corresponding to a top of a frame of the received signal; receiving an input of the initialization instruction; and performing the initialization at a timing determined in accordance with a result of comparison between the phase comparison value included in the initialization instruction and a phase of the spread code at the frame timing.

Advantageous Effects of Invention

According to the spread-spectrum-signal reception apparatus and the spread code initialization method of the present invention, a time from detection of a timing of spread code initialization to the initialization can be lengthened.

DESCRIPTION OF EMBODIMENTS

Figure 1:
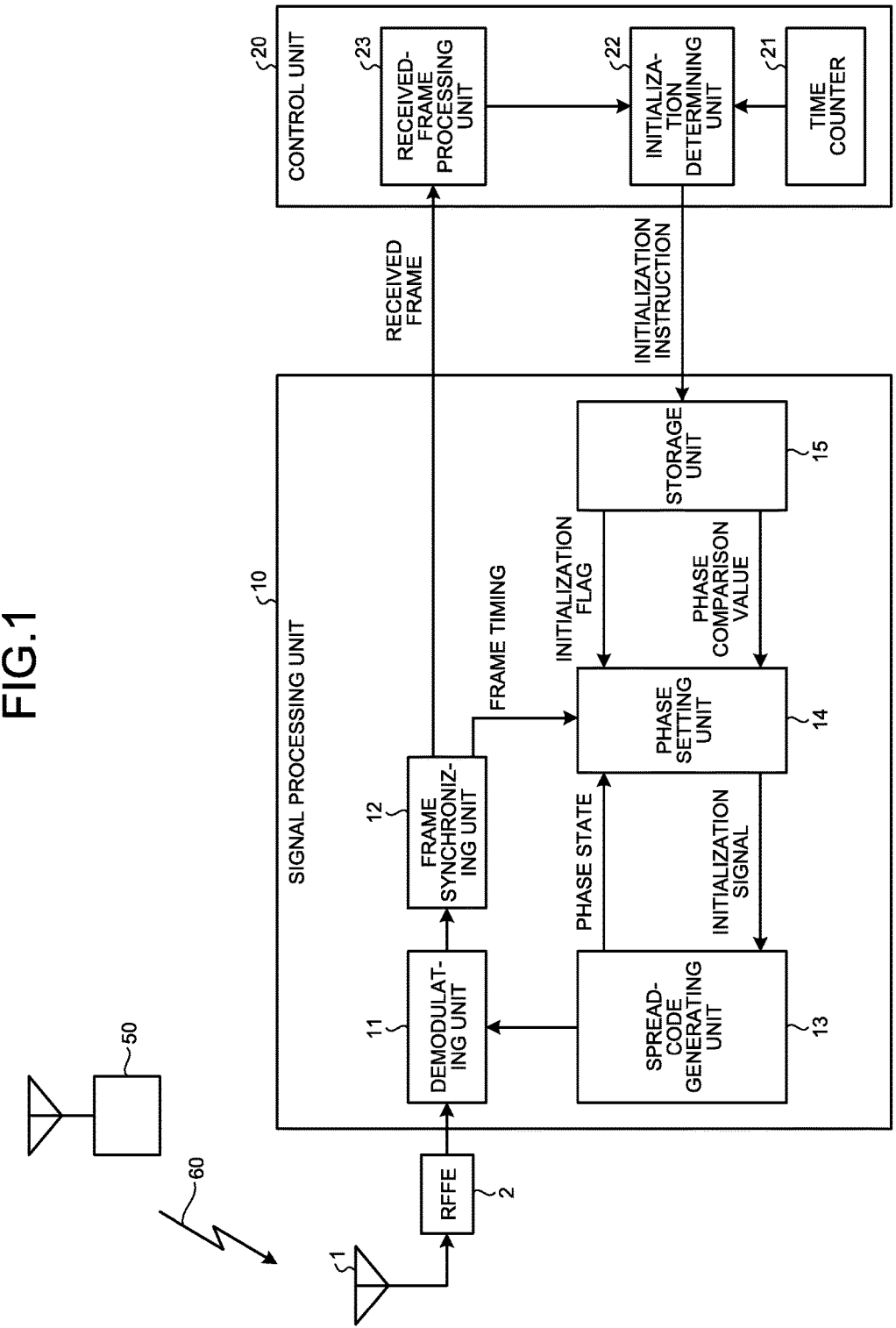
FIG. 1 is a block diagram illustrating a functional example configuration of a spread-spectrum-signal reception apparatus according to a first embodiment of the present invention.

The embodiments for carrying out the present invention will be described below with reference to the accompanying drawings. In the drawings referred to in the following descriptions, like or corresponding parts are denoted by like reference numbers.

First Embodiment

FIG. 1 is a block diagram illustrating a functional configuration example of a spread-spectrum-signal reception apparatus according to a first embodiment of the present invention. In FIG. 1, the spread-spectrum-signal reception apparatus includes a receiving antenna 1, an RF (Radio Frequency) front end (RFFE) 2, a signal processing unit 10, and a control unit 20. The receiving antenna 1 is an antenna that receives a radio signal. The receiving antenna 1 receives a spread spectrum signal 60 transmitted by a transmission apparatus 50 illustrated in FIG. 1. The signal received by the receiving antenna 1 is converted to a baseband signal in the RFFE 2 and is then input to the signal processing unit 10.

The signal processing unit 10 includes a demodulating unit 11 that demodulates the baseband signal input from the RFFE 2; a frame synchronizing unit 12 that performs frame synchronization on the demodulated signal demodulated by the demodulating unit 11; a spread-code generating unit 13 that inputs a spread code to the demodulating unit 11; a phase setting unit 14 that sets the phase of the spread code for the spread-code generating unit 13; and a storage unit 15 that is controlled by the control unit 20. The signal processing unit 10 performs signal processing on a received spread spectrum signal. The control unit 20 controls the signal processing unit 10 and includes a time counter 21, an initialization determining unit 22, and a received-frame processing unit 23. Although the spread-spectrum-signal reception apparatus can also include the functions of a general radio-signal reception apparatus other than the functions illustrated in FIG. 1, illustrations of such functions are omitted here in order to simplify the drawing.

Figure 2:
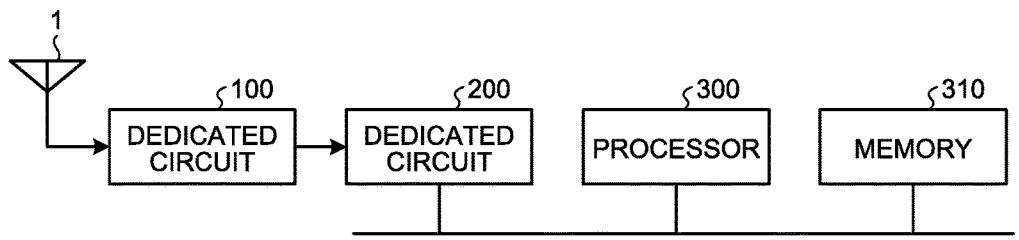
FIG. 2 is a block diagram illustrating an example hardware configuration of a spread-spectrum-signal reception apparatus according to the first embodiment.

The RFFE 2 can be realized by a configuration generally used in an existing reception apparatus as illustrated in FIG. 2. For example, the RFFE 2 can be realized by a dedicated circuit 100. The signal processing unit 10 can be realized as a dedicated circuit 200 constituted by an ASIC (Application Specific Integrated Circuit) or an FPGA (Field Programmable Gate Array), for example. The control unit 20 can be realized by the execution of a program stored in a memory 310 on a processor 300. The signal processing unit 10 can also be realized as a processor with a program being executed on the processor, or the control unit 20 can be realized as a dedicated circuit.

An operation of the spread-spectrum-signal reception apparatus of the present embodiment is described next. First, a reception process that the spread-spectrum-signal reception apparatus normally performs is described. As illustrated in FIG. 1, the receiving antenna 1 receives the spread spectrum signal 60 transmitted from the transmission apparatus 50. The RFFE 2 processes the signal acquired by the receiving antenna 1. Processing performed by the RFFE 2 is processing generally performed by a reception apparatus that receives a radio signal, such as amplification, frequency conversion, filtering, and analog-digital conversion (A/D conversion). The RFFE 2 performs these processes and outputs a baseband signal.

In the signal processing unit 10, the demodulating unit 11 first performs processing generally performed by a reception apparatus that receives a spread spectrum signal, such as signal acquisition, synchronization tracking, despreading, and symbol determination, on the baseband signal, which is a digital signal; and it then extracts an estimated value of the transmitted data (transmitted-data estimated value) transmitted by a transmission apparatus. The demodulating unit 11 uses a spread code generated by the spread-code generating unit 13 as a spread code for processing the baseband signal, which is a spread spectrum signal.

Then, the frame synchronizing unit 12 performs a process that achieves data frame synchronization by using the transmitted-data estimated value output from the demodulating unit 11. Here, a frame means a data structure formed by a plurality of pieces of transmitted data. Error correction coding and the addition of an error detection code are generally performed on each of the frames. Therefore, a reception apparatus needs to perform frame synchronization in order to acquire a frame period correctly. There is a general method that achieves frame synchronization in which a known signal referred to as "synchronization word" or "synchronization preamble", which is formed by a known data pattern, is inserted into a frame in an apparatus transmitting the frame, and then a reception apparatus estimates the timing of this known signal by using a correlation calculation to establish frame synchronization. The frame synchronizing unit 12 establishes frame synchronization by using the processing described above, and it outputs the transmitted-data estimated value after frame synchronization is established as a received frame to the control unit 20 in the subsequent stage.

In the control unit 20 the received-frame processing unit 23 performs, on the received frame, a process of decomposing the frame data structure in order to extract individual transmission information, for example.

Next, a process of initializing a phase of a spread code performed by the spread-spectrum-signal reception apparatus is described. In this example, the control unit 20 sets an initialization instruction to be sent from the control unit 20 to the signal processing unit 10 via the storage unit 15, which is included in the signal processing unit 10. The storage unit 15 can be realized as a register or a memory, for example. The phase setting unit 14 of the signal processing unit 10 reads the initialization instruction set by the control unit 20 in the storage unit 15 so that the signal processing unit 10 operates under the control of the control unit 20. The storage unit 15 can store therein information indicating a state of the signal processing unit 10, for example; and the control unit 20 can read this information and use the information to control the signal processing unit. The storage unit 15 does not need to be hardware integral with the signal processing unit 10 but can be realized as separate hardware.

In the following descriptions, the flow of processing in which the signal processing unit 10 initializes the phase of a spread code under the control of the control unit 20 is described in detail referring to a flowchart illustrated in FIG. 3. At the start of the operation, the signal processing unit 10 acquires a radio signal received by the demodulating unit 11 and establishes signal synchronization (Step S41). When the signal is successfully acquired, the demodulating unit 11 can obtain a despreading signal for which the phase of the spread code output by the spread-code generating unit 13 and the phase of the received signal match each other and which also has a signal-to-noise power ratio that is sufficiently high. When the signal acquisition is successfully performed and signal synchronization is established, the processing shifts to the next step (Step S42). Otherwise, the process at Step S41 is repeated.

Next, at Step S42, the demodulating unit 11 performs tracking of the received signal, and the frame synchronizing unit 12 performs frame synchronization. The frame synchronizing unit 12 outputs the received signal subjected to frame synchronization to the control unit 20. Then, at Step S43, the demodulating unit 11 determines whether signal synchronization is lost. When a signal synchronization is lost, the processing returns to Step S41. When the signal synchronization is not lost, the following process at Step S44 is performed.

Next, at Step S44, the initialization determining unit 22 in the control unit 20 compares the initialization time included in preset initialization information and the current time held by the time counter 21 in the control unit 20 with each other, and it determines whether the current time is within a settable time window with respect to the time when initialization is to be performed. The settable time window is specified by time-window information, which is separately defined. The control unit 20 can determine that the received-frame processing unit 23 has not lost a signal by using the received frame received from the signal processing unit 10. Alternatively, the control unit 20 can receive a notification from the signal processing unit 10 separately.

When it is determined at Step S44 that the current time is not within the time window, the processing returns to Step S42 and continues. When the current time is within the time window, the process at Step S45 is performed. For the initialization time included in the initialization information, a setting input from outside can be received. In a case where the initialization time can be acquired by calculation or the like, the initialization time can be obtained in the control unit 20. Also, the settable time window can be preset as a fixed value, or it can be received as a setting from outside.

At Step S45, the initialization determining unit 22 writes an initialization instruction to the storage unit 15. The initialization instruction includes an initialization flag and a phase comparison value. The initialization flag is a flag for instructing the signal processing unit 10 to perform initialization. The phase comparison value is a value indicating the phase of a spread code at the top of a frame immediately before a timing at which initialization of the phase of the spread code is performed. For example, in a case where the spread code is generated by a single LFSR (linear feedback shift register) or a combination of a plurality of LFSRs, the phase comparison value is a value corresponding to a tap state of the LFSR (i.e., a value of the shift register). When the period of a data frame, the period of the spread code, and the time of last initialization are known, the phase comparison value at the time at which the next initialization is performed can be obtained easily.

Next, at Step S46, the phase setting unit 14 acquires the phase comparison value and the initialization flag from the initialization instruction written into the storage unit 15. In a case where the initialization flag is written into the storage unit 15, the phase setting unit 14 acquires the phase state of the spread-code generating unit 13 from the spread-code generating unit 13 at the top of every frame in accordance with a frame timing (a timing signal synchronized with the frame period) indicating the top of a received frame output from the frame synchronizing unit 12; compares the phase of a spread code generated by the spread-code generating unit 13 and the phase comparison value with each other; and determines whether the top of a current frame is the top of the frame immediately before initialization is performed. When the top of the current frame is not the top of the frame immediately before initialization is performed, the processing returns to S42 and continues. When the top of the current frame is the top of the frame immediately before initialization is performed, the following process at Step S47 is performed.

At Step S47, when the phase of the spread code at the top of the received frame, which is indicated by the phase state, and the phase comparison value match each other, the phase setting unit 14 instructs the spread-code generating unit 13 to initialize the phase state of the spread code with an initialization signal at the timing of the top of a next frame. The spread-code generating unit 13 then initializes the phase of the spread code to be generated. For example, in a case where the spread code is generated by a combination of LFSRs as described before, the spread-code generating unit 13 overwrites the tap state of the LFSR (the value of the shift register) with an initialization value.

In FIG. 1, a configuration is used in which the initialization value described above is not actually specified for the spread-code generating unit 13. However, by using a configuration in which the initialization value is specified, it is possible to set the spread code to any phase state at the top of a frame at which the spread code is initialized. In this case, the initialization value (for example, the tap state of the LFSR) used by the spread-code generating unit 13 can be set in the storage unit 15 from the control unit 20; and the phase setting unit 14 can set that initialization value in the spread-code generating unit 13. Further, the control unit 20 can obtain in advance the state of a spread-code generator at the phase of the spread code for which the initialization value is to be set, and it can determine the initialization value from the tap state of the LFSR or the like in that state.

Figure 4:
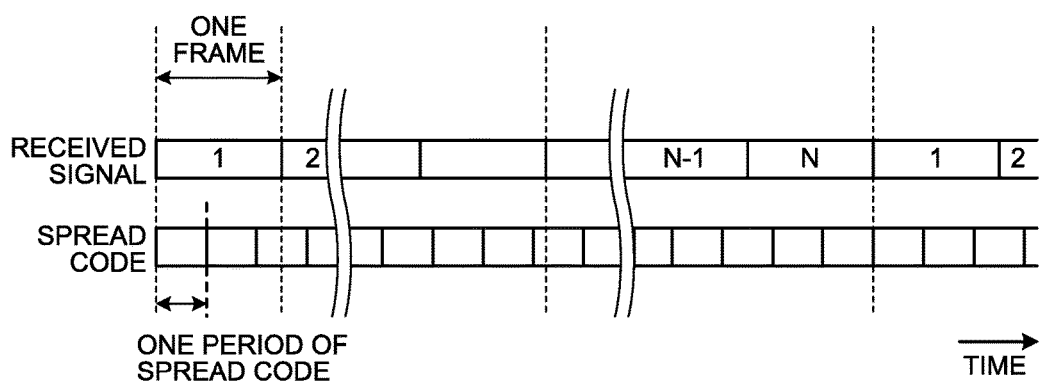
FIG. 4 is a timing diagram illustrating an example of the relation between a period of a frame of a received signal and a period of a spread code.
Figure 5:
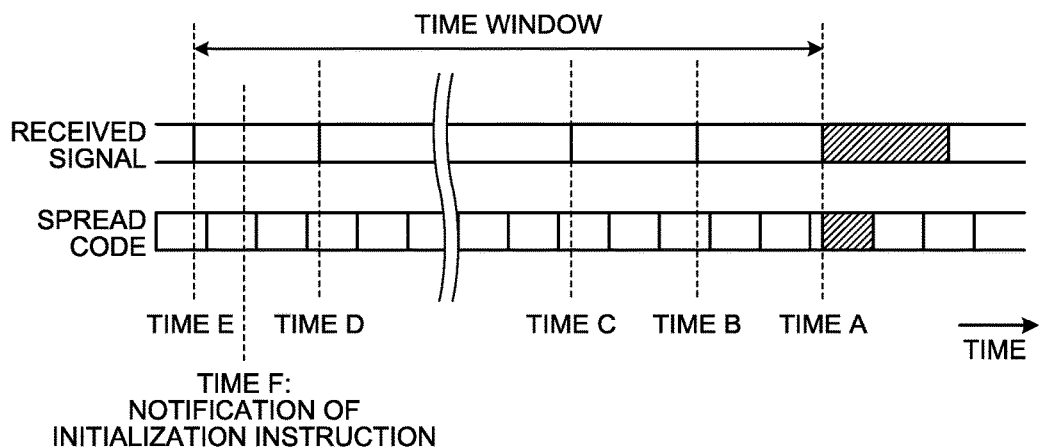
FIG. 5 is a timing diagram illustrating a specific example of process to initialize the phase of a spread code of the spread-spectrum-signal reception apparatus according to the first embodiment.

A specific example of the spread code initialization process described above is described here with reference to the timing diagrams illustrated in FIGS. 4 and 5. FIG. 4 is a timing diagram illustrating an example of the relation between a frame of a received signal (a frame after despread) and a spread code. In FIG. 4, each frame of the received signal is numbered. FIG. 4 illustrates an example in which the time of one frame is different from one period of a spread code, which corresponds to a relation between one message of an LEX (L-band experiment) signal and a long code disclosed in International Publication No. WO/2012/101935. The LEX signal has a configuration in which one period of a message is one second and each message includes a preamble for frame synchronization at the top thereof. Meanwhile, one period of the long code is 410 milliseconds.

In a case where the relation between a frame period and the period of a spread code is a relation in which one is not an integer multiple of the other as illustrated in FIG. 4, a period at which the timing of the top of a frame and the timing of the initial phase of the spread code match each other is relatively longer than the period of the spread code. For example, in the case of the LEX signal described before, the top timing of a frame and the timing of the initial phase of the spread code match each other every 21 seconds, which is the least common multiple of the period of the message and the period of the long code, i.e., N=21 in FIG. 4. Based on a case where a frame and a spread code have such a relation as an example, an operation of a spread-spectrum-signal reception apparatus according to the present embodiment is specifically described referring to FIG. 5.

In FIG. 5, a time A that is a time at which initialization of a phase of a spread code is performed is used as a reference; and a time window is set to have a length from the time A to a time E. It is assumed that at a time F in this time window, the signal processing unit 10 is notified of an initialization instruction by the process at Step S46. In this initialization instruction, the signal processing unit 10 is notified, as a phase comparison value, of a phase of the spread code at a time B that is a timing of the top of a frame immediately before the time A. In the signal processing unit 10, the phase setting unit 14 compares the phase of the spread code of the spread-code generating unit 13 and the phase comparison value with each other at a timing of the top of each frame. In the example of FIG. 5, the result of the phase comparison is a mismatching at a time D and a time C but a matching at the time B. The phase setting unit 14 then issues an instruction to the spread-code generating unit 13 with the process at Step S47 in such a manner that the phase of the spread code is initialized at the timing of the top of a next frame. The spread-code generating unit 13 initializes the phase of the spread code.

A method of defining the length of the time window is described below. The length of the time window is defined to be such a length that the same phase as a phase of the spread code at the top of a frame immediately before initialization does not appear at the top of another frame within a section of the time window. In a case where a relation between a frame period and the period of a spread code is not a relation in which one is an integer multiple of the other as described before, the same phase does not appear at the top of a frame within a time period equal to the least common multiple of both of the periods. By using this relation, it is possible to determine whether to perform initialization within a defined time window and it is possible to determine a timing at which initialization is performed on the basis of a relation with the top of a frame. Therefore, it is possible to perform an initialization instruction from the control unit 20 to the signal processing unit 10 relatively slowly. Consequently, even in a case where processing with high immediacy is difficult, for example in a case where an interface between the control unit 20 and the signal processing unit 10 is a simple asynchronous interface, spread code initialization can be achieved easily.

Although a case where the signal processing unit 10 determines whether to perform initialization at the timing of the top of a frame immediately before the timing at which initialization of a phase of a spread code is performed is described above as an example, the determination of the timing is not limited thereto. The determination can be performed at the top of any frame before the frame immediately before the timing of initialization, as long as the determination is performed within the time window. In a case where the determination is performed in a frame other than the frame immediately before initialization, an identical initializing operation can be achieved by counting the number of remaining frames until initialization. Further, a configuration can be used in which a time interval between the determination of initialization to the carrying out of initialization can be freely set within a range of the time window by specifying, by the control unit 20, the number of frames between a frame in which initialization is performed and the frame in which it is determined whether to perform initialization.

Figure 3:
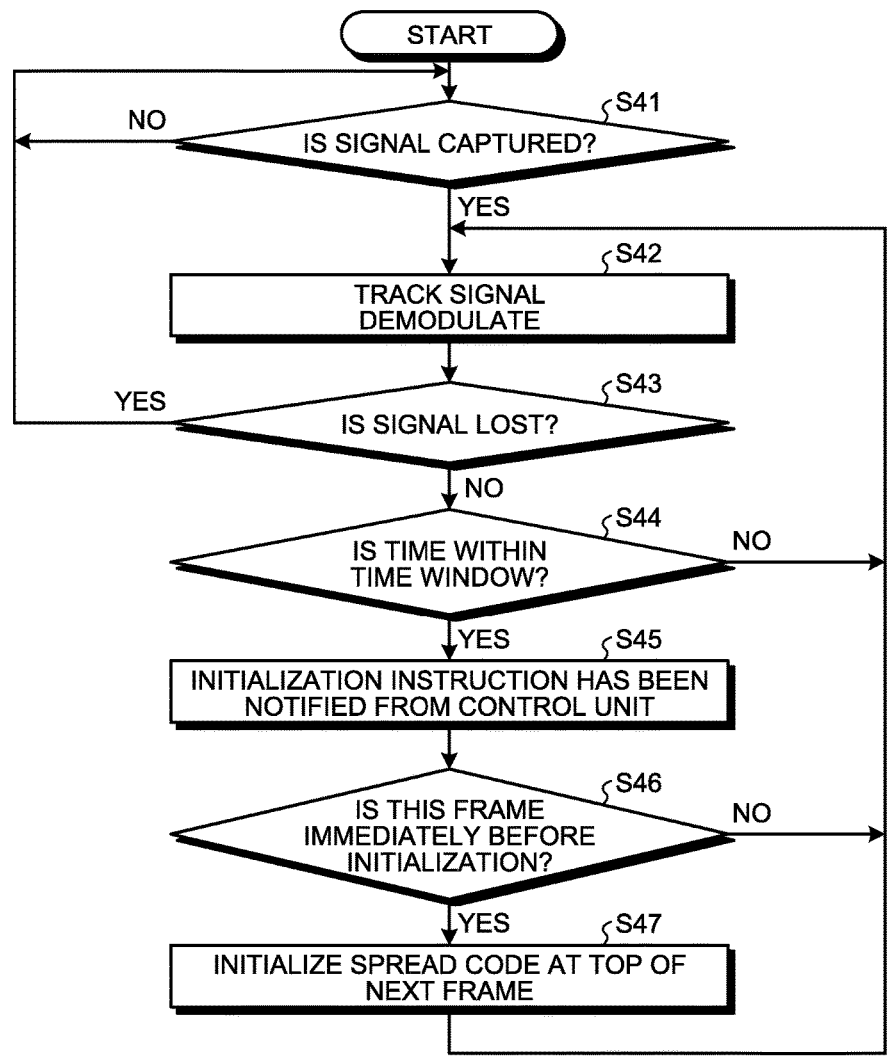
FIG. 3 is a flowchart illustrating a processing flow in which a phase of a spread code is initialized by the spread-spectrum-signal reception apparatus according to the first embodiment.

Further, the flowchart in FIG. 3 illustrates processing of one wave of a spread spectrum signal that is received. In a case of simultaneously receiving a plurality of spread spectrum signals for which spread codes are different from each other, the processing based on the flowchart in FIG. 3 can be performed on every signal. When those signals are synchronized with each other, signal acquisition to be performed first can be performed for a certain wave only; synchronization of other signals can be established in accordance with the result of the signal acquisition; and thereafter processing such as demodulation and synchronization tracking can be performed individually. In this case, the spread-spectrum-signal reception apparatus can include the signal processing unit 10 configured in such a manner that each of the spread spectrum signals can be processed as necessary.

As described above, a spread-spectrum-signal reception apparatus according to the present embodiment includes a control unit and a signal processing unit. The control unit obtains a phase comparison value that is the phase of a spread code at a time at which initialization of the phase of the spread code is performed and which corresponds to the timing of the top of a frame of a received signal; and it outputs an initialization instruction including the phase comparison value when having determined that a current time is within a range of a time window defined with respect to the time at which initialization is performed. The signal processing unit demodulates the received signal in accordance with the spread code; performs a frame synchronizing process on the demodulated signal to detect the frame timing corresponding to the top of a frame of the received signal; and in response to an input of the initialization instruction, performs initialization at a timing determined in accordance with the result of a comparison between the phase comparison value included in the initialization instruction and the phase of the spread code at the frame timing. Therefore, it is possible to lengthen the time from detection of the timing of spread code initialization to initialization.

INDUSTRIAL APPLICABILITY

As described above, a spread-spectrum-signal reception apparatus according to the present invention can easily perform regular initialization of a spread code of a spread spectrum signal by cooperation between a signal processing unit and a control unit, even though an interface is low in immediacy like an asynchronous access interface. Therefore, easiness of apparatus design, downscaling of an apparatus, reduction in power consumption, and reduction of price can be given, for example; and the spread-spectrum-signal reception apparatus according to the present invention is useful as a reception apparatus of a spread spectrum signal.

REFERENCE SIGNS LIST 1 receiving antenna, 2 RF front end (RFFE), 10 signal processing unit, 11 demodulating unit, 12 frame synchronizing unit, 13 spread-code generating unit, 14 phase setting unit, 15 storage unit, 20 control unit, 21 time counter, 22 initialization determining unit, 23 received-frame processing unit, 50 transmission apparatus, spread spectrum signal, 100 dedicated circuit, 200 dedicated circuit, 300 processor, 310 memory.

The invention claimed is:
1. A spread-spectrum-signal reception apparatus to receive a signal having a spectrum spread with a spread code, the spread-spectrum-signal reception apparatus comprising:
   a controller
      to obtain a phase comparison value that is a phase of the spread code at a time at which initialization of a phase of the spread code is performed and which corresponds to a timing of a top of a frame of the signal, and
      to output an initialization instruction including the phase comparison value when having determined that a current time is within a range of a time window defined with respect to the time at which the initialization is performed; and a signal processor
to demodulate the received signal in accordance with the spread code,
to perform a frame synchronizing process on the demodulated signal to detect a frame timing corresponding to a top of a frame of the received signal, and
to perform, in response to input of the initialization instruction, the initialization at a timing determined in accordance with a result of comparison between the phase comparison value included in the initialization instruction and a phase of the spread code at the frame timing.

2. The spread-spectrum-signal reception apparatus according to claim 1, wherein
the controller sets an initialization value that initializes a phase of the spread code in the signal processor, and
the signal processor initializes a phase of the spread code with the initialization value.

3. A spread code initialization method performed by a controller and a signal processor included in a spectrum-spread-signal reception apparatus to receive a signal having a spectrum spread with a spread code, the spread code initialization method comprising:
obtaining by the controller of a phase comparison value that is a phase of the spread code at a time at which initialization of the phase of the spread code is preformed and which corresponds to a timing of a top of a frame of the signal;
determining by the controller that a current time is within a range of a time window defined with respect to the time at which the initialization is performed;
outputting by the controller of an initialization instruction including the phase comparison value when a current time is within the range of the time window;
demodulating the signal received by the signal processor in accordance with the spread code and performing a frame synchronizing process with respect to the demodulated signal to detect a frame timing corresponding to a top of a frame of the received signal;
receiving by the signal processor of an input of the initialization instruction; and
performing by the signal processor of the initialization at a timing determined in accordance with a result of comparison between the phase comparison value included in the initialization instruction and a phase of the spread code at the frame timing.

4. The spread code initialization method according to claim 3, further comprising determining by the controller of an initialization value that initializes a phase of the spread code, wherein
the phase of the spread code is initialized with the initialization value during performing of the initialization.

* * * * *